United States Patent
Sonkin et al.

(10) Patent No.: US 8,196,136 B2
(45) Date of Patent: Jun. 5, 2012

(54) CONFIGURATION AND CHANGE MANAGEMENT SYSTEM WITH RESTORE POINTS

(75) Inventors: Dmitry Sonkin, Redmond, WA (US); Murali Sangubhatla, Kirkland, WA (US); Marc Greisen, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 1268 days.

(21) Appl. No.: 11/864,044

(22) Filed: Sep. 28, 2007

(65) Prior Publication Data

US 2009/0089776 A1 Apr. 2, 2009

(51) Int. Cl.
G06F 9/44 (2006.01)
G06F 9/445 (2006.01)
G06F 11/00 (2006.01)

(52) U.S. Cl. ........ 717/176; 717/121; 717/175; 717/177; 717/178; 714/25; 714/38

(58) Field of Classification Search .................. None
See application file for complete search history.

(56) References Cited

U.S. PATENT DOCUMENTS

| | | | |
|---|---|---|---|
| 6,173,420 B1 * | 1/2001 | Sunkara et al. ............ 714/38.14 |
| 6,275,953 B1 | 8/2001 | Vahalia et al. |
| 6,418,554 B1 * | 7/2002 | Delo et al. .................... 717/174 |
| 6,609,184 B2 | 8/2003 | Bradshaw et al. |
| 6,640,317 B1 * | 10/2003 | Snow ........................... 714/38.1 |
| 6,698,018 B1 * | 2/2004 | Zimniewicz et al. ......... 717/175 |
| 6,745,350 B1 | 6/2004 | Cline et al. |
| 6,931,558 B1 | 8/2005 | Jeffe et al. |
| 7,058,849 B2 | 6/2006 | Erstad |
| 7,080,279 B2 | 7/2006 | Asare et al. |
| 7,174,479 B2 | 2/2007 | Kutan et al. |
| 7,185,335 B2 * | 2/2007 | Hind et al. ..................... 717/176 |
| 2003/0037325 A1 * | 2/2003 | Hargrove et al. ............. 717/175 |
| 2003/0159137 A1 * | 8/2003 | Drake et al. .................. 717/172 |
| 2004/0015961 A1 * | 1/2004 | Chefalas et al. .............. 717/178 |
| 2004/0025157 A1 * | 2/2004 | Blight et al. .................. 717/174 |
| 2004/0032837 A1 | 2/2004 | Visser |
| 2004/0034816 A1 | 2/2004 | Richard |
| 2004/0143830 A1 * | 7/2004 | Gupton et al. ................ 717/174 |
| 2005/0132358 A1 * | 6/2005 | Peev et al. ..................... 717/174 |
| 2006/0020937 A1 * | 1/2006 | Schaefer ........................ 717/174 |
| 2006/0112311 A1 | 5/2006 | Cobb |
| 2006/0174243 A1 * | 8/2006 | Brewer et al. ................. 717/174 |
| 2007/0061803 A1 | 3/2007 | Barrett |
| 2007/0169109 A1 * | 7/2007 | Neswal .......................... 717/174 |
| 2008/0141240 A1 * | 6/2008 | Uthe ............................. 717/174 |

OTHER PUBLICATIONS

Koo, et al., "Checkpointing and Rollback-Recovery for Distributed Systems", IEEE, 1986, pp. 1150-1158.
Lomet, et al., "Efficient Transparent Application Recovery in Client-Server Information Systems", SIGMOD'98, vol. 27, No. 2, ACM, 1998, pp. 460-471.

\* cited by examiner

*Primary Examiner* — Isaac Tecklu
(74) *Attorney, Agent, or Firm* — Russell S. Krajec; Krajec Patent Offices, LLC

(57) ABSTRACT

A configuration and change management system may have installation and configuration processes that include a discovery mechanism for discovering incomplete installations or configuration changes, a cleanup mechanism for placing the system in a state to continue, an installation or configuration mechanism, and a rollback mechanism for rolling back to a defined restore point if a problem is detected. The configuration and change management system may be used for initial installation, as well as configuration changes after installation. The system may be used in a multiple server environment with interdependencies between devices, as well as a multiple services environment with interdependencies between applications and services, including services provided over the Internet.

11 Claims, 4 Drawing Sheets

CONFIGURATION AND CHANGE MANAGEMENT SYSTEM WITH RESTORE POINTS

BACKGROUND

Installation and configuration of servers and enterprise applications can be a difficult task. In many cases, such operations may involve many different computer systems and servers, as well as services that may be provided on different devices. When deploying applications, services, or servers that have interdependencies with other applications, services, or services, problems during installation or configuration changes may have a wide range of causes and effects, leading to time consuming and costly investigation and cure.

SUMMARY

A configuration and change management system may have installation and configuration processes that include a discovery mechanism for discovering incomplete installations or configuration changes, a cleanup mechanism for placing the system in a state to continue, an installation or configuration mechanism, and a rollback mechanism for rolling back to a defined restore point if a problem is detected. The configuration and change management system may be used for initial installation, as well as configuration changes after installation. The system may be used in a multiple server environment with interdependencies between devices, as well as a multiple services environment with interdependencies between applications and services, including services provided over the Internet.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
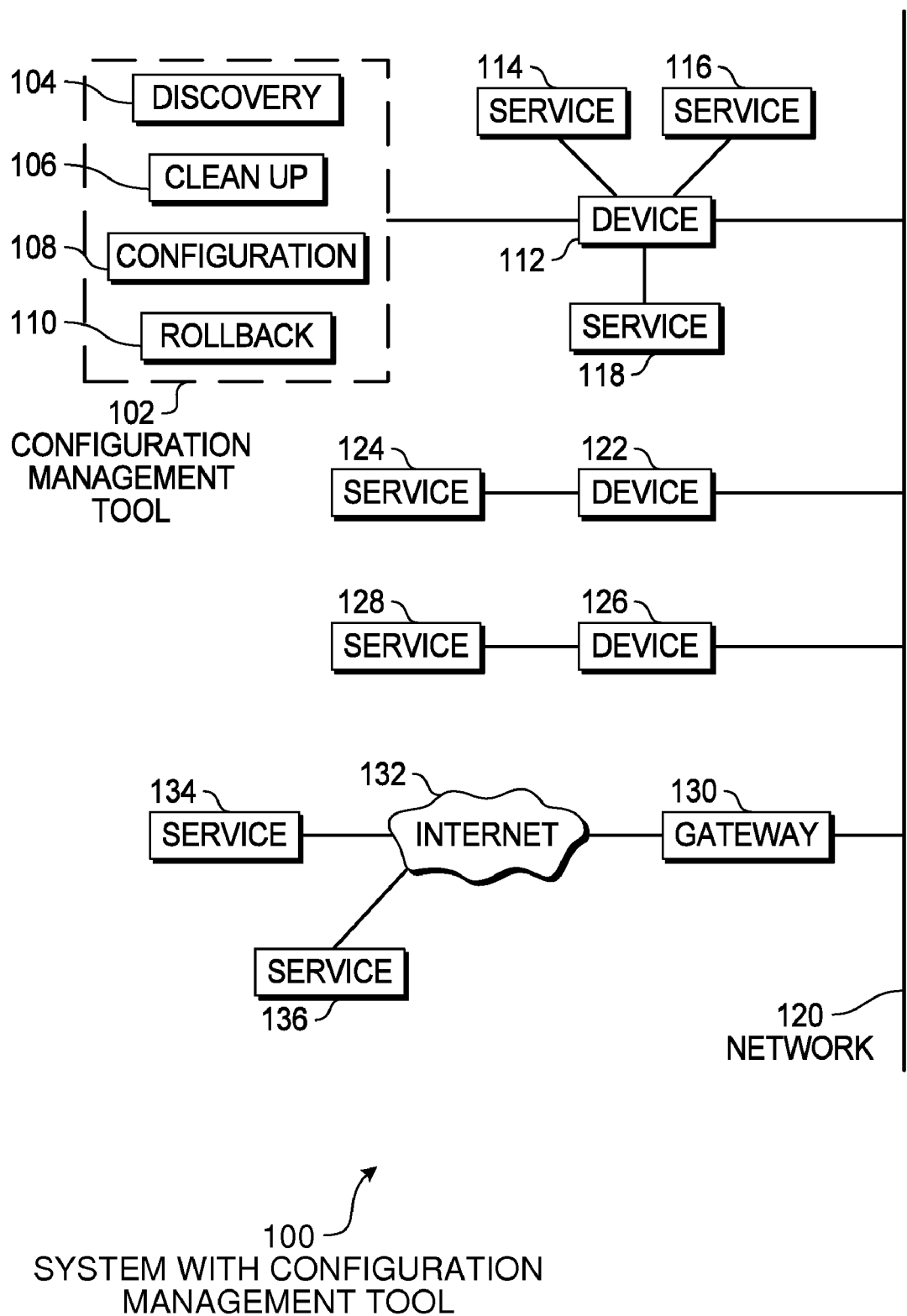
FIG. 1 is a diagram illustration of an embodiment showing a system with a configuration management tool.

An installation and configuration tool may use a discovery mechanism, clean up mechanism, configuration mechanism, and rollback mechanism to manage the installation and configuration of software and hardware components. The tool may be used in multiple device and multiple service environments where interdependencies may exist between services and devices.

A configuration sequence may include several tasks and install points. A task may be any action that may be defined to change the system state from a first state to a second state. The system may be a single service or application operating on a single device, a group of services operating on a device, a single service operating over several devices, or several services operating over several devices. Install points may be predefined configurations within a configuration sequence where the system may be left in an operable state during the configuration sequence. A configuration sequence may have several install points defined.

The discovery mechanism may inspect conditions for each install point to determine if the install point has been successfully configured. In some instances, the discovery mechanism may check a configuration log, while in other instances, the discovery mechanism may detect the status of a service or other result of a completed task.

When the discovery mechanism determines that an install point has not been reached, a clean up mechanism may configure the system so that an installation or configuration task may be performed.

After the discovery mechanism and clean up mechanisms have completed, a starting point for configuration is defined and configuration may begin, task by task. If a task fails, a rollback routine may be used to step backwards through the configuration sequence to an install point.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system that contains a configuration management tool 102. Embodiment 100 is an example of a system that may use a configuration management tool 102 to install and configure services and devices. The services and devices may operate in a multiple service and a multiple device environment.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

A configuration management tool 102 may contain a discovery mechanism 104, a cleanup mechanism 106, a configuration mechanism 108, and a rollback mechanism 110. The configuration management tool 102 may be used to install or configure software or hardware components in a system.

The configuration management tool 102 may be used to install or configure applications, services, or devices with the environment of embodiment 100. The configuration management tool 102 may configure complex operating system level services, applications that interface with multiple services or devices, or other complex hardware and software components where interdependencies with other hardware or software components exist.

A system may be a single device, a single device operating multiple services, a service that operates in conjunction with several devices, or a system may comprise multiple services operating on multiple devices.

A multiple service environment may be one in which the configuration management tool 102 may interact with two or more separate services that may interact with the service, application, or device that is being installed or configured. In such an environment, an installation or configuration operation may have interdependencies with other services.

For example, the configuration management tool 102 may be used to install a messaging and email system on the device 112. The device 112 may have several services 114, 116, and 118 that may be used by the messaging and email system. Examples of such services may include a Domain Name Service (DNS), a file management service, and a user authentication service. During the installation and configuration of the example mail service, the configuration tool 102 may interface with the various other services, may change configuration settings of the other services, and perform other functions with the services.

In some embodiments, the configuration management tool 102 may be used to interface with remote services. Such services 134 and 136 may be available over the network 120, through the gateway 130 and the Internet 132. In some cases, the configuration management tool 102 may configure services 134 and 136 directly or in conjunction with the installation of a local service 114, 116, or 118 on device 112.

A multiple device environment may be one in which the configuration management tool 102 may interact with two or more devices during a configuration or installation operation. In such an environment, there may be interdependencies between the various devices.

For example, an application may have a component that operates on device 112 as well as a component that operates on devices 122 and 126. Such components may be designed for some level of redundancy, where one component performs similar tasks as another. Such a design may be used for high volume processing applications or when one component may serve as a backup for the other.

Components of an application may be configured to run on separate devices so that each device may perform a different function in the overall application. For example, an application may be configured with a database component that operates on one device and a web based user interface component on a second device. Both components may act together as a single application but may operate on two or more devices.

Some environments may have multiple devices and multiple services that have interdependencies both as devices and as services. Some environments may have distributed services that are spread across multiple devices. Some environments may include complex systems that may include multiple servers that may perform different tasks and having different services that have interdependencies with an application or device being installed.

In an example of such an environment, the configuration management tool 102 may be used to install and configure an application on device 112, where the application may depend on services 124 and 128 on devices 122 and 126, as well as services 134 and 136 available remotely. During a configuration operation, each of the various services and devices may be contacted in some manner. In some cases, an installation sequence may expressly verify that a service exists. In other cases, an installation sequence may install and configure a service on another device.

The configuration management tool 102 may be used with any type of device, such as a server computer, a personal computer, a network appliance, network routing and connectivity hardware, firewalls, gateways, wireless devices, personal digital assistants, cellular telephones, other telephony devices, or any other device.

The configuration management tool 102 may interface with any type of service or application, including operating system services, network connection services, file system services, user authentication authorization and accounting services, as well as any type of application or service.

Figure 2:
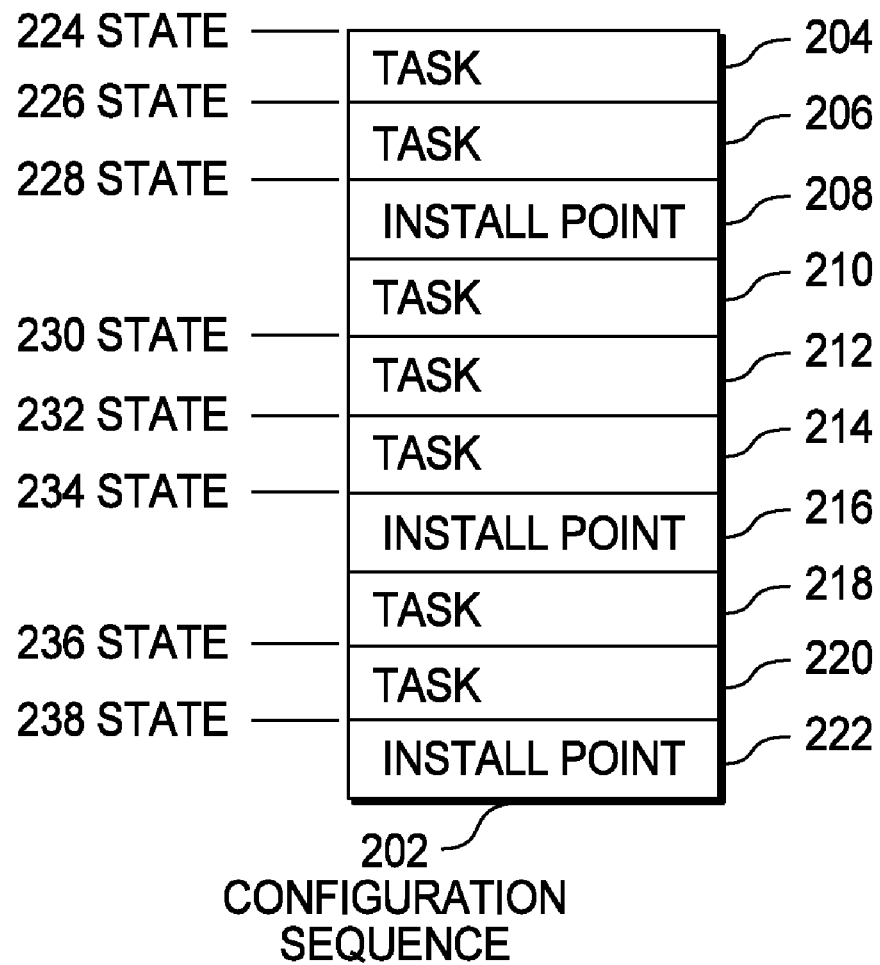
FIG. 2 is a diagram illustration of an embodiment showing a configuration definition.

FIG. 2 is a diagram illustration of an embodiment 200 showing a configuration definition. Embodiment 200 is one example of how a configuration sequence 202 may be defined and constructed.

The configuration sequence 202 may be defined with several tasks and install points. A task may be an operation that changes the state of a system from one state to another. An install point may be a point in the configuration sequence 202 where the system may be in an operable state, although without having completed the configuration sequence.

In the configuration sequence 202, tasks 204 and 206 precede install point 208. Tasks 210, 212, and 214 precede install point 216, and tasks 220 and 222 precede install point 222.

Each task may change the state of the system. For example, task 204 may change from state 224 to state 226, while task 206 may change from state 226 to 228. Install point 208 does not change the state of the system, but serves as a reference point.

Task 210 may change the state from state 228 to 230, task 212 from state 230 to 232, and task 214 from state 232 to 234. Task 218 may change from state 234 to 236, and finally task 220 may change from state 236 to 238, which may be the final state of the configuration sequence 202.

Each state change may change some aspect of the system, from a setting in an application being installed, to a configuration of a remote service provided over the Internet and to which the application may interface. In some cases, a change from one state to another may comprise a single setting or configuration item. In other cases, a change from one state to another may comprise a long list of actions and activities.

In some embodiments, a configuration sequence 202 may be used for defining an installation sequence for an application, service, or the initial configuration of a hardware device or accessory. In other embodiments, the configuration sequence 202 may be used for upgrading, updating, or other periodic maintenance. In still other embodiments, the configuration sequence 202 may be used for making administrative changes or reconfiguring a system.

The system on which the configuration definition 200 may operate may be a system comprising a single device. In some cases, the system may comprise several devices, each with several separate services or applications that may interact with the application, service, or device that is being configured by the configuration definition 200.

Figure 3:
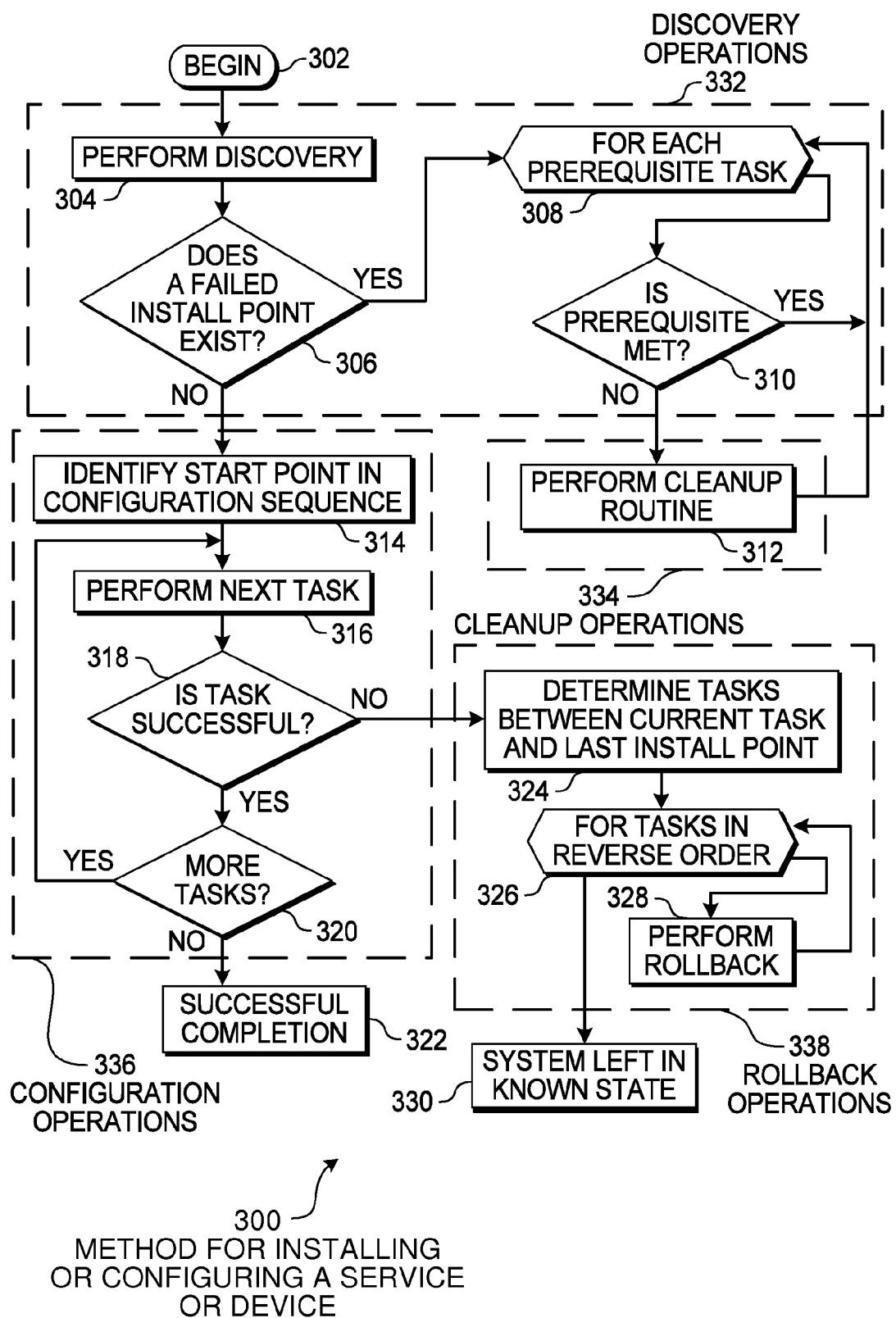
FIG. 3 is a flowchart illustration of an embodiment showing a method for installing or configuring a service or device.

FIG. 3 is a flowchart illustration of an embodiment 300 showing a method for installing and configuring a service or device. Embodiment 300 is one example of a sequence that may be used for installing and configuring a system. The system may be a single application or service that operates on a single device, while in other embodiments a system may be defined as a device operating several interacting services or applications, an application or service that interacts with several other services provided on other devices or accessed remotely, or an application or service that operates on several interacting devices.

Embodiment 300 is one example of a sequence or process that may be used. Other embodiments may have additional steps, or may remove or consolidate steps together. Other embodiments may use different nomenclature or terminology to label the functional portions of the process.

The method begins in block 302.

Discovery is performed in block 304. Discovery may be performed in any manner that identifies if a previous attempt at installation or configuration had failed.

In many instances, a discovery routine may read a set of install points from a configuration sequence. The install points may include specific services or other items that may be configured in a specific manner when the tasks leading up to the install point were successfully performed. Each install point may have a list of predefined prerequisites that can be directly or indirectly verified during a discovery sequence.

In an embodiment with direct verification, the discovery performed in block 304 may include running executable code or using other detection mechanisms that may verify each of the prerequisites of an install point.

For example, a discovery action may include executable code to query a service to determine if the service is running and evaluate if the service is properly configured.

In some embodiments, a discover routine may indirectly verify an install point by examining a log of a previous configuration operations to determine if various install points were reached in a previous operation. In such an embodiment, a prerequisite for an install point may be a successful completion of a task. In many instances, a task may be a prerequisite.

The discover routine of block 304 may use any mechanism or combination of mechanisms to determine if a previous installation or configuration routine was successful and, if a failure occurred, the location within the configuration sequence where the failure occurred.

If a failed install point exists in block 306, each prerequisite task may be analyzed in block 308. If the prerequisite is not met in block 310, a cleanup routine may be performed in block 312.

In many embodiments, a cleanup routine of block 312 may perform the task associated with the prerequisite, but in other cases, the clean up routine may perform a subset of actions that may enable a subsequent task to successfully perform.

After the discovery and cleanup operations, a start point in a configuration sequence may be identified in block 314. In many embodiments, a start point may be the last successfully completed install point within a configuration sequence. In some instances, a start point may be at a task in between two install points. In an instance where a configuration sequence has not been performed, the start point may be the first task.

A task is performed in block 316, and if the task is successful in block 318, and more tasks exist in block 320, another task is performed in block 316. When all the tasks are successfully completed in block 320, the configuration sequence may terminate with a successful completion in block 322.

The task of block 316 may be any action or group of actions that may be performed to change the system from one state to another. In some cases, a task may be to change a single setting. In other cases, a task may involve several steps or actions. Each embodiment may define steps in different manners.

If a task is not successful in block 318, the tasks between the current task and the last successful install point are determined in block 324. For those tasks in reverse order in block 326, a rollback routine may be performed in block 328. After the group of tasks are rolled back, the system may be left in a known and operable state in block 330 that corresponds with a install point defined within the sequence.

In many cases, a rollback routine may undo a series of actions that define a particular task. In other cases, a rollback routine may perform some clean up or otherwise undo any effects of a task without undoing each and every step. For example, during an installation task, a large amount of data may be downloaded and installed in a particular service. During a rollback operation, the data may be kept in a directory structure but the installation of the data in the service may be undone.

Embodiment 300 is a method by which a set of configuration sequence may be performed. During a discovery phase, any previously failed attempts of the configuration sequence may be uncovered and corrected so that another attempt may be made. The configuration sequence may be stepped through task by task, evaluating each task to ensure success. If a task is unsuccessful, a series of rollback operations may be performed to bring the system back to a known and operational state.

The discovery group of actions 332 in blocks 304 through 310 may be performed by a discovery mechanism. A cleanup mechanism may perform the cleanup operations 334. The configuration operations 336 include blocks 314 through 320, and the rollback operations 338 include blocks 324 through 328.

Figure 4:
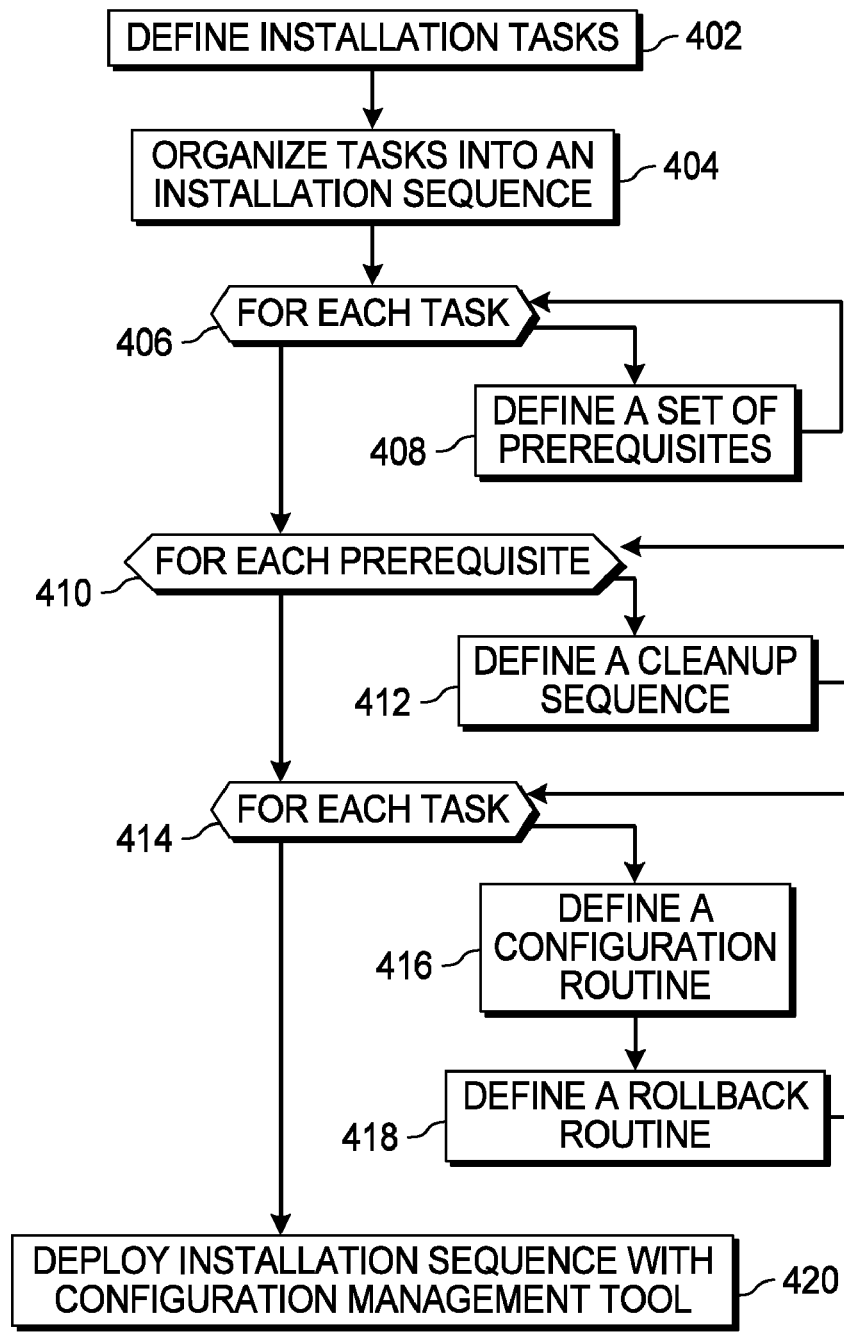
FIG. 4 is a flowchart illustration of an embodiment showing a method for creating a configuration sequence.

FIG. 4 is a flowchart illustration of an embodiment 400 showing a method for creating a configuration sequence. Embodiment 400 is one example of a method that may be used to create a configuration sequence for a system. Such a sequence may be used to install, modify, or configure an application, service, or device in various environments. Other embodiments may use different sequences, nomenclature, or mechanisms to perform similar actions or functions.

Installation tasks may be defined in block 402. In many cases, executable code, scripts, or other instructions may be assembled for each task individually.

The tasks may be organized into an installation sequence in block 404. In many cases, an installation sequence may include install points that may be defined for places within the sequence where the system may be in an operable state, and to which a rollback may be performed.

For each task in block 406, a set of requirements may be defined in block 408. In many cases, a requirement may be the successful completion of the task. Additionally, some cases may include requirements that define the successful completion of each portion of a task. For example, a task may ensure that a service on a specific device is running and that the service is configured properly, which may also serve as the requirements.

In some embodiments, the requirement definition in block 408 may be an item that can be verified, such as the configuration and operation of a specific service. For items that may be difficult to check, a requirement may be that the task has successfully completed. In embodiments where a verification of a specific item is performed during the discovery process, a script or other executable code may be written to perform such a verification.

For each prerequisite in block 410, a cleanup sequence may be defined in block 412. In some cases, a cleanup sequence may include executing a task associated with the prerequisite. In other cases, a cleanup sequence may set a variable, enable an action, stop a service, or perform some operation that may enable a task or configuration routine to perform. In such cases, the cleanup sequence may put various items in a condition where the configuration sequence may execute, and the configuration sequence may perform subsequent operations on the items in order to complete any configuration that may be done.

For each task in block 414, a configuration routine may be defined in block 416 and a rollback routine may be defined in block 418. A configuration routine may be a script or other executable file that performs any type of action that configures a system according to the task. Such routines may include loading data or executable files, setting registry values, modifying configuration files, configuring hardware settings, or any other task. In some cases, a configuration routine may engage different services or devices during execution.

A rollback routine in block 418 may be defined to undo the effects of a configuration routine. In some cases, a rollback routine may undo each action of a configuration routine, while in other cases, a rollback routine may set a system in a previous operable state.

The prerequisites, cleanup sequence, configuration routines, and rollback routines may be organized together into an installation sequence in block 420 and deployed.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
   determine that a failed installation has occurred, said failed installation being defined by a sequence of install points, each of said install points having a set of configuration prerequisites;
   examine said a sequence of install points to determine that a first install point was successful and a second install point was unsuccessful, said first install point being prior to said second install point;
   examine said a set of configuration prerequisites for said second install point to determine a first prerequisite that is met and a second prerequisite that is not met;
   perform a cleanup operation adapted to meet said second prerequisite;
   identify a start point within a configuration sequence based on said first install point and said second install point;
   perform a portion of said configuration sequence starting with said start point, said configuration sequence comprising a series of tasks, said portion of said configuration starting with a first task, said start point being defined by a first state.
   execute said first task successfully, said first task comprising changing from a first state to a second state;
   identify a problem with a second task; and
   perform a second rollback sequence for said second task, said second rollback sequence being adapted to revert to said second state.

2. The method of claim 1 further comprising:
   performing a first rollback sequence for said first task, said first rollback sequence being adapted to revert to said first state.

3. The method of claim 1 being performed in a multi-device environment.

4. The method of claim 3, said first prerequisite being a state of a first device, said second prerequisite being a state of a second device.

5. The method of claim 3, said first task being performed on a first device, a second of said series of tasks being performed on a second device.

6. The method of claim 1 being performed in a multi-services environment.

7. The method of claim 6, said first prerequisite being a state of a first service, said second prerequisite being a state of a second service.

8. The method of claim 7, said first service being a local service, said second service being a remotely accessible service.

9. The method of claim 6, said first task being performed on a first service, a second of said series of tasks being performed on a second service.

10. A computer readable medium not comprising a propagated wave but comprising computer executable instructions adapted to perform the method of claim 1.

11. A system comprising:
a processor;
a discovery mechanism operating on said processor and adapted to:
  determine that a failed installation has occurred;
  examine a sequence of install points to determine that a first install point was successful and a second install point was unsuccessful; and
  examine a set of configuration prerequisites for said second install point to determine a first prerequisite that is met and a second prerequisite that is not met;
a cleanup mechanism adapted to:
perform a cleanup operation adapted to meet said second prerequisite; and a configuration mechanism adapted to:
  identify a start point within a configuration sequence based on said first install point and said second install point;
  perform a portion of said configuration sequence starting with said start point, said configuration sequence comprising a series of task, said portion of said configuration sequence starting with a first task, said start point being defined by a first state;
execute said first task successfully, said first task changing from said first state to a second state,
identify a problem with a second task, said system further comprising:
  a rollback mechanism adapted to:
    perform a second rollback sequence for said second task, said
    second rollback sequence adapted to revert to said second state; and
    perform a first rollback sequence for said first task, said first rollback sequence adapted to revert to said second state.

* * * * *